United States Patent [19]
Hwang et al.

[11] Patent Number: 5,919,892
[45] Date of Patent: *Jul. 6, 1999

[54] POLYAMIC ACIDS AND METHODS TO CONVERT POLYAMIC ACIDS INTO POLYIMIDEBENZOXAZOLE FILMS

[75] Inventors: Wen-Fang Hwang; William J. Harris, both of Midland, Mich.

[73] Assignee: The Dow Chemical Company, Midland, Mich.

[ * ] Notice: This patent is subject to a terminal disclaimer.

[21] Appl. No.: 08/331,775

[22] Filed: Oct. 31, 1994

[51] Int. Cl.$^6$ .......................... C08G 73/10; C08G 73/22; C08G 73/06
[52] U.S. Cl. .......................... 528/220; 528/335; 528/336; 528/341
[58] Field of Search .................................... 528/220, 289, 528/274, 335, 336, 341

[56] References Cited

U.S. PATENT DOCUMENTS

| | | | |
|---|---|---|---|
| 3,410,826 | 11/1968 | Endrey . | |
| 4,087,409 | 5/1978 | Preston . | |
| 4,470,944 | 9/1984 | Asakura et al. | 264/216 |
| 4,886,873 | 12/1989 | Mukai et al. . | |
| 4,954,608 | 9/1990 | Uekita et al. | 528/350 |
| 4,958,002 | 9/1990 | Imatani et al. | 528/353 |
| 5,145,916 | 9/1992 | Yamamato et al. | 525/421 |
| 5,494,991 | 2/1996 | Kaneko et al. | 528/179 |

FOREIGN PATENT DOCUMENTS

| | | |
|---|---|---|
| 0355927 | 2/1990 | European Pat. Off. . |
| 0393826 | 3/1990 | European Pat. Off. . |
| 458435 | 3/1970 | Japan . |
| 2289621 | 11/1990 | Japan . |
| 9201678 | 2/1992 | WIPO . |

OTHER PUBLICATIONS

Preston et al., Journal of Polymer Science: Part A–1, vol. 7, pp. 283–296, (1969).

Mercer et al., High Performance Polymers, 5, pp. 97–106 (1993).

"Fibers from Ordered Benzheterocycle–Imide Copolymers," *Appl. Poly. Sym.*, No. 9, pp. 145–158 (1969), DE Winter.

"New High–Temperature Polymers, VIII Ordered Benzoxazole– and Benzothiazole–Imide Copolymers," *J. Poly. Sci.*, Part A–1 (1969), 7(1), pp. 283–296, DE Winter.

"Azole Analogs of Polypyromellitimides," *Vysokomol. Soed.*, (A) XIII, No. 11, 1971, pp. 2565–2570, Yevstaf'ev et al..

"Correlations Between the Properties and Structures of some Polyhetero–arylenes," *Vysokomol. Soed.*, vol. (A) XIV, No. 10, 1972, pp. 2174–2182, Yevstaf'ev.

Chem. Ab. 115:183981f, Nozawa, Seiichi, *Kagaku to Kogyo*, 44(7), 1154 (1991).

Nozawa et al., "Synthesis and Mechanical Properties of Novel Polyimide Containing Heterocycles," 22nd International SAMPE Technical Conference, Nov. 6–8, 1990, pp. 680–692.

*Primary Examiner*—Jeffrey Mullis

[57] ABSTRACT

This invention relates to polyamic acids and to methods for converting polyamic acid into polyimidebenzoxazole polymers. The polyamic acids are prepared by reacting a dianhydride with a diaminobenzoxazole under conditions sufficient to form polyamic acid with an inherent viscosity of greater than 2.0 dL/gram, as measured at 0.2 g/dL in N-methyl-pyrrolidinone at 25° C. The polyamic acids are converted to polyimidebenzoxazole in the form of films, fiber, coatings and the like using thermal and chemical processes.

21 Claims, No Drawings

POLYAMIC ACIDS AND METHODS TO CONVERT POLYAMIC ACIDS INTO POLYIMIDEBENZOXAZOLE FILMS

BACKGROUND OF THE INVENTION

The present invention relates to polyamic acids ("PAA"), to a method for converting PAA into polyimide-benzoxazole ("PIBO") polymers, and to films and coatings of PIBO.

In the preparation of polyimidebenzoxazole, a dianhydride and diaminobenzoxazole are first reacted to form a polyamic acid. The polyamic acid is then converted to PIBO by closing the amic acid linkages to form imide rings. Heretofore, only a limited number of dianhydride/diaminobenzoxazole combinations have been disclosed for producing PIBO. While these limited number of PIBO polymers have been formed into fibers and films, the resulting fibers and films do not generally have sufficient physical and/or chemical properties (such as tensile modulus, tensile strength, elongation-at-break and coefficient of thermal expansion (CTE)) to make them generally useful in applications such as for the electronics industry.

For example, U.S. Pat. No. 4,087,409 to Preston "Ordered Heterocyclic Copolymers" broadly teaches reacting two symmetrical monomers to produce an essentially linear heterocyclic polymer having at least two different heterocyclic linkages. Polyamic acids can be prepared by selecting monomers from an otherwise long list of monomers (e.g. 2,2'-p-phenylene bis(5-aminobenzoxazole) and pyromellitic dianhydride). Using the exemplified techniques, non-benzoxazole-containing polyamic acids are prepared at inherent viscosities of 1.13 dL/gram. Films made from these polymers and techniques are described in summary fashion, without specific processing techniques for preparing the films or physical properties disclosed.

"Fibers from Ordered Benzheterocycle-Imide Copolymers," *Appl. Poly. Sym.*, No. 9, pp. 145–158 (1969) describes the preparation of amic acid polymers by polycondensing specific aromatic dianhydrides and aromatic diaminobenzoxazoles. The polyamic acids exhibit inherent viscosities of 1.5 dL/gram and less. Without disclosing, in detail, the specific techniques, the polyamic acids are formed into PIBO fibers. These fibers have less than desirable physical properties, particularly tensile strengths.

"New High-Temperature Polymers, VIII Ordered Benzoxazole- and Benzothiazole-Imide Copolymers," *J. Poly. Sci.*, Part A-1 (1969), 7(1), pp. 283–296, describes the preparation of ordered heterocycle copolymers prepared from aromatic dianhydrides reacted with aromatic diamines containing preformed benzoxazole or benzothiazole units. The ordered heterocyclic copolymers were prepared in their soluble polyamic acid form with inherent viscosities no greater than 1.78 dL/gram and fabricated to the desired film, fiber or metal coating. After fabrication, the polyamic acid is converted to PIBO such as by forming a film from the polyamic acid solution, and heating the film for 20 minutes at 100° C., 20 hours at 145° C. and then 300° C. for 1 hour. Films made from these polymers are described in summary fashion, using terms like "brittle" or "strong."

"Azole Analogs of Polypyromellitimides," *Vysokomol. Soed.*, Vol. (A) XIII, No. 11, 1971, pp. 2565–2570, discloses synthesis of azole-containing analogs of poly-[N,N'-(p,p'-phenoxyphenylene)pyro-mellitimide]. Structure V in this paper is a PIBO prepared from 2,6-di(p,p'-aminophenoxyphenyl)benzo-[1,2-d:5,4-d']bisoxazole and pyromellitic dianhydride. The inherent viscosity of the particular polyamic acid used to make this PIBO is 2.5 dL/gram.

Similarly, "Correlations Between the Properties and Structures of some Polyhetero-arylenes," *Vysokomol. Soed.*, Vol. (A) XIV, No. 10, 1972, pp. 2174–2182, in comparing the mechanical properties of other polyimides with those of polyheteroarylenes of similar structure, shows a PIBO polymer in Structure II. The inherent viscosity of the particular polyamic acid used to make the described PIBO is 2.5 dL/gram or less. The physical/chemical properties of the film made from these polymers range from poor to moderate.

U.S. Pat. No. 4,866,873 to Mukai et al. also discloses an aromatic heterocyclic polyimide comprising substantially equimolar amounts of a specific aromatic, trans-benzobisoxazole or trans-benzobisthiazole diamine such as 2,6-(4,4'-diaminodiphenyl)benzo[1,2-d:4,5-d']bisoxazole and a specific aromatic tetracarboxylic dianhydride such as pyromellitic dianhydride. The polyamic acids for these polyimides are prepared in an amide solvent and converted to PIBO. Inherent viscosities of suitable polyamic acids are described as being from 0.5 to 20 dL/g. Japanese Patent Application No. 2-41819 to Mitsubishi Kasei Corporation describes similar PIBO polymers from a polyamic acid made from specific aromatic tetracarboxylic dianhydrides such as pyromellitic dianhydride and specific aromatic, trans-benzobisoxazole or trans-benzobisthiazole diamines such as 2,6-(4,4'-diaminodiphenyl)benzo[1,2-d:4,5-d']bisoxazole. The polyamic acids have an inherent viscosity of at least 0.1 and preferably 1 or more dL/gram. Similar polyamic acids having an inherent viscosity ranging from 2.19 dL/gram to 3.07 dL/gram and PIBO polymers made therefrom are also described in "Novel Aromatic Heterocyclic Polyimide (PIBT) Having Ultra-High Modulus of Elasticity" by Seiichi Nozawa, *Kagaku to Kogyo*, 44(7), 1154 (1991).

"Synthesis and Mechanical Properties of Novel Polyimide Containing Heterocycles" by Nozawa, Taytama, Kimura and Mukai presented at the 22nd International SAMPE Technical Conference (held Nov. 6–8, 1990), teaches synthesis of one type of trans-PIBT and trans-PIBO using a polyamic acid of 4,4'-diamino phenylenebenzobisthiazole and pyromellitic dianhydride with thermal and chemical ring closure techniques. The polyamic acid used to prepare the PIBO had an inherent viscosity of 3.09 to 3.79 dL/gram. The polymers prepared from the specific aromatic, trans-benzobisoxazole or trans-benzobisthiazole diamine and pyromellitic dianhydride are prepared as fibers.

European Patent Publication No. 0355927 to Asahi discloses a polyimide precursor comprising a specific polyamic acid ester, polyamic amide or polyamic acid salt structure derived from a tetracarboxylic acid compound and a specific diamine compound exhibit low solution viscosity. The monomers used to make the polyimide precursors are generally rigid and symmetrical and each polymer repeat unit contains a pendant organic group having 1 to 20 carbon atoms. The polyamic acid precursors have reduced viscosities from 0.1 to 2.0 dL/gram. The polymers form a photopolymerizable composition with a photopolymerization initiator. The resulting PIBO polymer can be used to coat substrates for subsequent use in photolithography. Films produced from these cross-linked polymers exhibit relatively low tensile strengths and tensile modulus.

Japanese Patent Application No. 41-42458 (Patent KOHO No. 45-8435) to Taoka Senryo Seizo K.K. teaches the synthesis of PIBO from a polyamic acid with the polyamic acid being prepared from an aromatic diamine containing a single benzoxazole ring such as 5-amino-2-(4-aminophenyl) benzoxazole and an aromatic tetracarboxylic acid dianhydride using thermal ring closure techniques.

In view of these deficiencies, it remains desirable to prepare PIBO polymers which have a more desired combination of chemical and physical properties than those previously reported. In addition, it remains desirable to convert these PIBO polymers into useful films and coatings.

SUMMARY OF THE INVENTION

Accordingly, in one aspect, the present invention is a polyamic acid having an inherent viscosity of greater than 2.0 dL/g, as measured at 0.2 g/dL in N-methylpyrrolidinone at 25° C., which is the reaction product of a dianhydride of the formula:

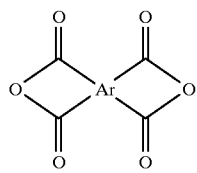

and a diaminobenzoxazole of any of the following formulae:

a)
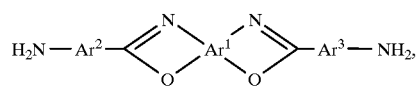

b)
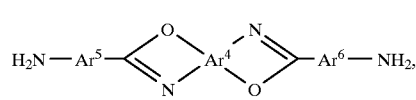

c)
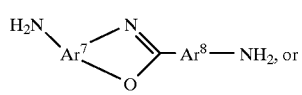

d)
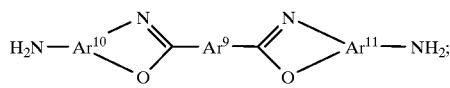

where Ar, $Ar^1$, $Ar^2$, $Ar^3$, $Ar^4$, $Ar^5$, $Ar^6$, $Ar^7$, $Ar^8$, $Ar^9$, $Ar^{10}$ and $Ar^{11}$ can be any aromatic group or pyridine group; except that Ar does not equal

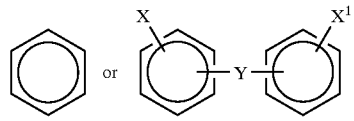

where Y is a single covalent bond, —O—, —CH$_2$—, —S—, —CO—, —SO$_2$—, —C(CH$_3$)$_2$— or —C(CF$_3$)$_2$— and where X and $X^1$ are hydrogen atoms, alkyl groups, alkoxy groups or halogen atoms or groups, when $Ar^4$, $Ar^5$, and $Ar^6$ are all

and except that
Ar does not equal

when $Ar^1$ is

and $Ar^2$ and $Ar^3$ are both

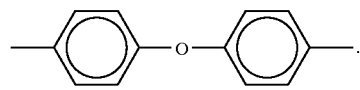

In another aspect, the present invention is a process for preparing a polyimidebenzoxazole from a solution of a polyamic acid (PA) by removing at least a portion of the solvent and exposing the polyamic acid to an imidization temperature from about 160° C. to about 280° C. to convert at least a portion of the polyamic acid to polyimidebenzoxazole. In a preferred embodiment, the polyamic acid/PIBO is further treated by exposing it to an additional temperature of from about 250° C. to about 600° C. for from about 0.1 to about 300 minutes. In a more preferred embodiment, this further heat-treatment comprises exposing the PA/PIBO to two or more different, successively higher temperatures. In a most preferred embodiment, the PA/PIBO is exposed to an annealing temperature from about 250° C. to about 400° C. for from about 0.1 to about 120 minutes and then optionally to a heat-treating temperature, higher than the annealing temperature, from about 260° C. to about 600° C. for from about 0.1 to about 120 minutes.

In yet another aspect, this invention is a method for preparing a polyimidebenzoxazole film which comprises the steps of:

a) forming a liquid film of a polyamic acid solution;
b) removing at least a portion of the solvent from the polyamic acid solution; and
c) heating the polyamic acid at an imidization temperature from about 160° C. to about 280° C. for a period of from about 5 to about 90 minutes.

In a preferred embodiment, the liquid film is contacted with a ring-closure agent prior to or while being heated to or at the imidization temperature.

In still another aspect, the present invention is a polyimidebenzoxazole film made using the described process.

Using the method of the present invention, PIBO polymers having an excellent balance of chemical and physical properties can be prepared, including a good combination of strength, modulus and elongation-at-break. By selecting the monomer combination and specific conditions of preparation, it is also possible to modify and design these properties. The PIBO products can be prepared as rigid and stiff or flexible depending on the specific monomers selected. The synthesis techniques for making polyamic acid and processing techniques for converting the polyamic acid into PIBO results in polymers having good molecular weights (as evidenced by inherent viscosity) and films and coatings with excellent properties, including excellent tensile properties; dielectrical properties such as dielectric constant, dissipation factor, break down voltage and arc tracking, and dimensional stability properties.

Among a number of other applications, the PIBO polymers of the present invention can be made into films and coatings in a multitude of electronics applications.

DETAILED DESCRIPTION OF THE INVENTION

In the present invention, polyamic acids (PAAs) are prepared by reacting a dianhydride monomer of the general formula:

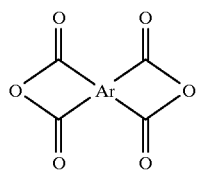

and a diaminobenzoxazole monomer of the following formula:

a)
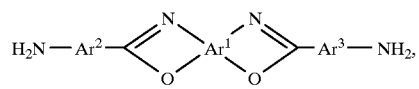

b)
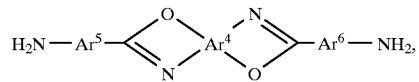

c)
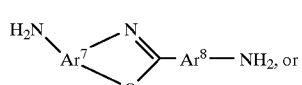

d)
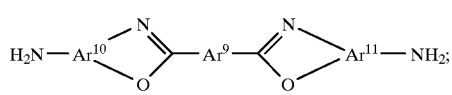

where Ar, $Ar^1$, $Ar^2$, $Ar^3$, $Ar^4$, $Ar^5$, $Ar^6$, $Ar^7$, $Ar^8$, $Ar^9$, $Ar^{10}$ and $Ar^{11}$ is an aromatic group, substituted aromatic group, or pyridine group.

Ar does not equal

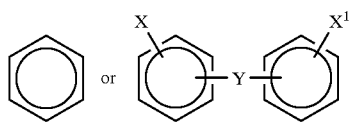

when $Ar^4$, $Ar^5$, and $Ar^6$ are all

and
Ar does not equal

when Ar1 is

and $Ar^2$ and $Ar^3$ are both

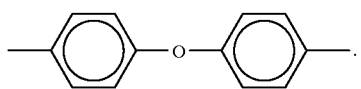

The preferred dianhydrides are:

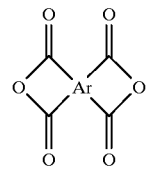

wherein Ar is:

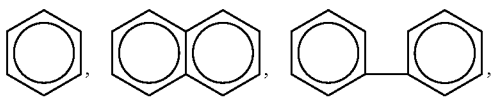

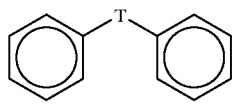

where T is —O—, —S—, —SO$_2$—, —CH$_2$—,

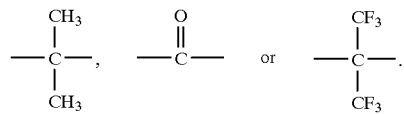

The most preferred dianhydrides are pyromellitic dianhydride ("PMDA"):

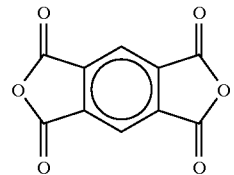

4,4'-oxydiphthalic anhydride ("ODPA"),

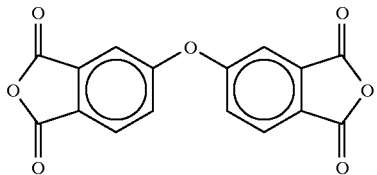

2,2-bis-(3,4-dicarboxyphenyl)hexafluoropropane dianhydride ("6FDA"),

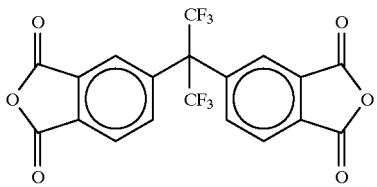

3,3',4,4'-biphenyltetracarboxylic dianhydride ("BPDA"),

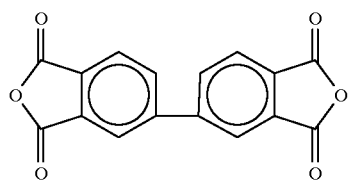

3,3',4,4'-diphenylsulfonetetracarboxylic dianhydride (DSDA), and

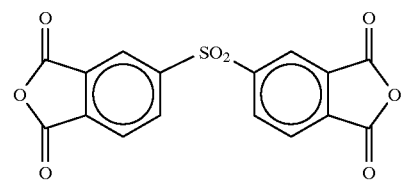

3,3',4,4'-benzophenonetetracarboxylic dianhydride.

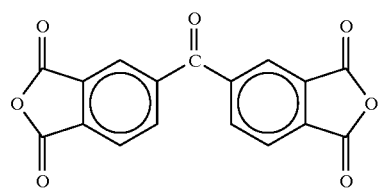

Preferred diaminobenzoxazole monomers include:

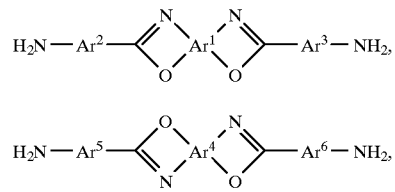

where Ar$^1$ and Ar$^4$ are:

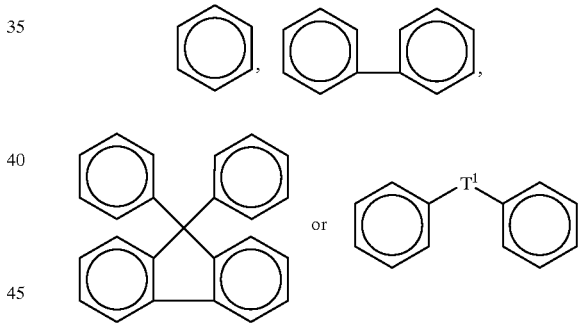

where T$^1$ is —O—, —SO$_2$—,

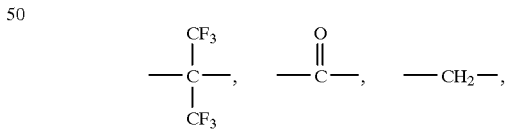

and where $Ar^2$, $Ar^3$, $Ar^5$ and $Ar^6$ are the same or different and are

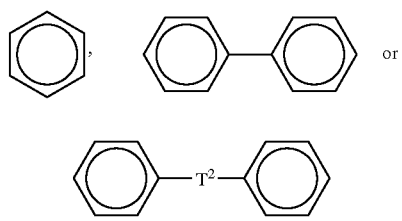 or and $T^2$ is —O—, —SO$_2$—, —S—,

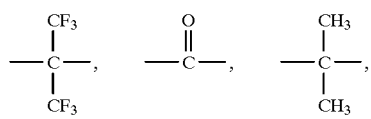

Preferred diaminobenzoxazole monomers include:

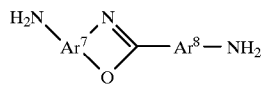

where $Ar^7$ is:

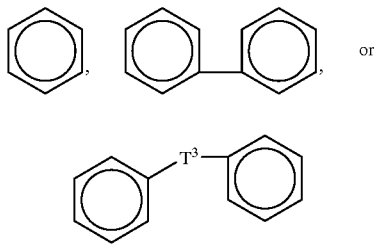 or where $T^3$ is selected from the same group as $T^2$ and where $Ar^8$ is selected from the same group as $Ar^2$, $Ar^3$, $Ar^5$ and $Ar^6$.

Preferred diaminobenzoxazole monomers include:

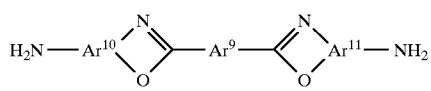

where $Ar^9$ is:

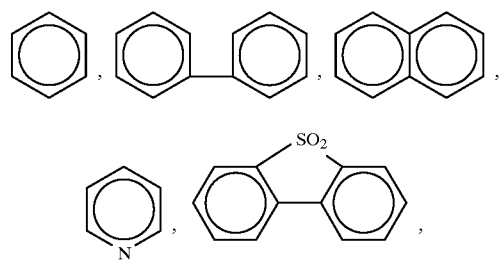

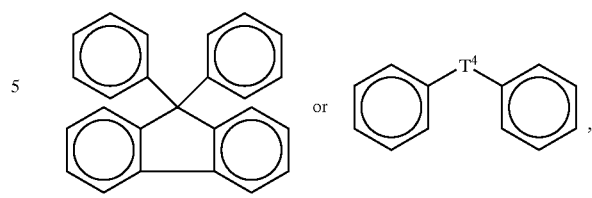 or and $T^4$ is:

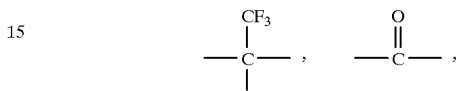

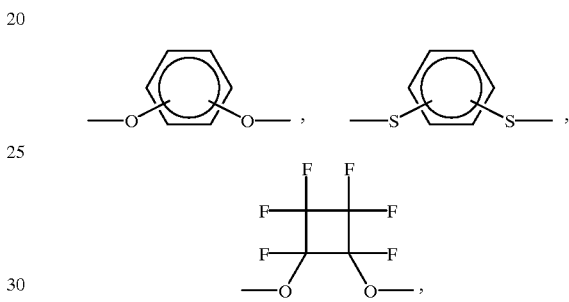

and $Ar^{10}$, $Ar^{11}$ are selected from the same group as $Ar^7$.

The most preferred diaminobenzoxazole monomers are 2,6-(4,4'-diaminodiphenyl)benzo[1,2-d:5,4-d']bisoxazole ("DABO"):

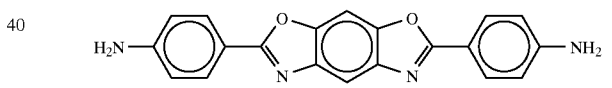

5-amino-2-(p-aminophenyl)benzoxazole ("pDAMBO"),

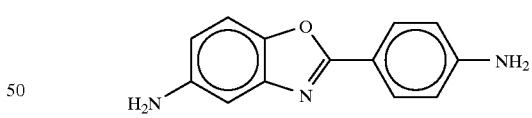

5-amino-2-(m-aminophenyl)benzoxazole ("mDAMBO"),

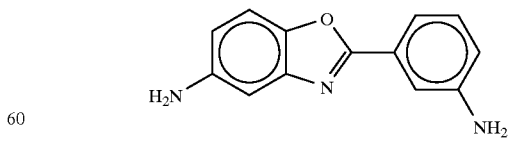

4,4'-diphenylether-2,2'-bis(5-aminobenzoxazole) ("OBA(DAMBO)$_2$"),

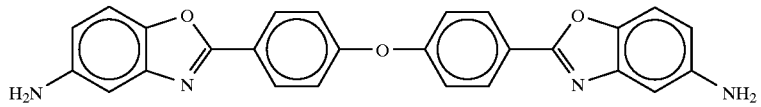

2,2'-p-phenylenebis(5-aminobenzoxazole) ("TA(DAMBO)₂"),

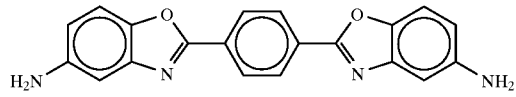

and 2,2-bis(4-phenyl)hexafluoropropane-2,2'-bis(5-aminobenzoxazole) ("6FA(DAMBO)₂").

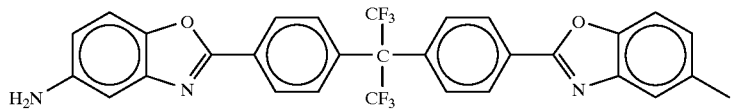

The PIBO can be prepared by reacting one or more dianhydrides with one or more diaminobenzoxazoles to form a polyamic acid and subsequently imidizing the reaction product.

The polyamic acid and its properties will vary depending on the amount and type of dianhydride and diaminobenzoxazole, and, if employed, any additional monomers. In general, the dianhydride and diaminobenzoxazole are employed in amounts from about 0.75 to about 1.25, preferably from about 0.8 to about 1.2, more preferably from about 0.9 to about 1.1, equivalents of dianhydride per equivalent of diaminobenzoxazole. To prepare a high molecular weight polyamic acid, the dianhydride and diaminobenzoxazole are most preferably employed in equivalent amounts (i.e., the reaction mixture contains equivalent number of amino and carboxylic anhydride groups). When non-stoichiometric amounts of the reactants are employed, the molecular weight is normally less than that achieved using stoichiometric amounts of reactants.

It is not particularly critical how the aromatic dianhydride and aromatic diamine are contacted and, in general, they are dissolved in a suitable reaction medium and reacted to form a polyamic acid solution. In the practice of the present invention, the liquid reaction medium is a solvent for the monomers and the resulting polyamic acid and is sufficiently inert to the monomer(s) that it does not significantly and deleteriously affect polymerization. Typically, the solvent is a polar, aprotic liquid. While the polar, aprotic liquid most advantageously employed as a liquid reaction medium is dependent on the specific dianhydride and diaminobenzoxazole employed, as well as the desired reaction product, preferred polar, aprotic solvents are generally amide solvents such as N,N-dimethylacetamide, N-methylpyrrolidinone, 1,3-dimethyl-5-imidazolidinone, N,N-dimethylformamide, 1,1,3,3-tetramethylurea, or N-cyclohexylpyrrolidinone. Mixtures of one or more polar aprotic liquids may also be employed as the liquid reaction medium. To facilitate the formation of a solution of the monomers or the resulting polymers in the solvent, inorganic salts such as lithium chloride and/or calcium chloride, can be added to the reaction mixture. However, this practice is not normally preferred. It is acceptable to have small amounts of non-reactive, non-solvents for polyamic acid (e.g., toluene) in the polar/aprotic solvent.

The aromatic dianhydride and aromatic diamine are dissolved in a suitable reaction medium and reacted to form a polyamic acid solution. For example, the aromatic dianhydride and aromatic diamine can be added separately, either neat or in solution, to a solvent in which both the dianhydride and diamine are soluble and then reacted. Alternatively, a solution of either the aromatic dianhydride or aromatic diamine can be prepared and the other reactant, either neat or dissolved in a solvent, can be added to the solution and then reacted in solution. Preferably, the monomers, either neat or as a solution, more preferably neat, are simultaneously added to the liquid reaction medium.

The reaction of the dianhydride, diaminobenzoxazole, and other comonomers, if any, can be conducted at any temperature between the freezing point and the boiling point of the solvent, but within that constraint, is preferably conducted at a temperature from about −40° C. to about 150° C., more preferably from about −20° C. to about 100° C., and most preferably from about 0° C. to about 50° C. Due to the equilibrium between amic acid linkage, the monomers' reactive functionalities and the presence of water (generated from thermal imidization) and its hydrolysis of amic acid linkages, the polymerization, as well as subsequent storage, is most preferably conducted at a temperature below about 50° C.

The monomers can be added to the liquid reaction medium in any amount which allows reaction but are typically limited by the solubility of the monomers and resulting polyamic acid. While the amount of the monomers most advantageously employed is dependent on a variety of factors, including the specific monomers and organic liquid employed and the resulting polymer, the monomers are preferably used in an amount such that their concentration in the liquid reaction medium is at least about 0.1 weight percent. In general, the monomers are employed in an amount from about 0.5 to about 50 percent based on the total weight of the monomers and the organic reaction liquid. In general, the monomers are preferably employed in an amount from about 1 to about 30 and more preferably in an amount from about 2 to about 20 weight percent based on the total weight of the monomers and organic reaction liquid employed.

In preparing the polyamic acid, it is most preferred that the monomers, solvent, and reactor vessel contain as little water as possible prior to reaction. In addition, conditions of extreme cleanliness are also most preferred. Preferably, there should be less than 5 mole percent water based on the total moles of dianhydride, diaminobenzoxazole and any optionally employed additional comonomers. If necessary, toluene, or other materials capable of forming an azeotrope with water, can be added to the solvent and later distilled off to remove water. The polyamic acid is also preferably prepared and stored in both an oxygen-free and water-free atmosphere to enhance the retention of molecular weight. In addition, the monomers can be recrystallized and/or sublimed prior to use to reduce impurities.

While not being bound by theory, the reaction of a diamine and dianhydride to form polyamic acid can be represented by:

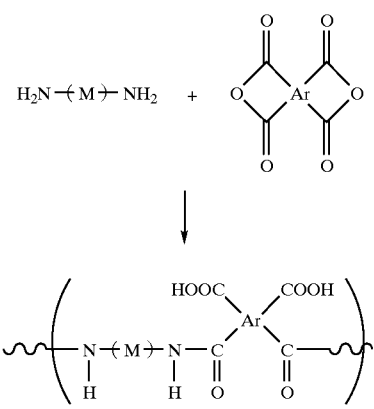

wherein M is an aromatic-containing group such as depicted hereinbefore and it being understood that the amic acid linkages can exist as a variety of substituted isomers.

In addition to the dianhydride and diamine, the polyamic acid may optionally be prepared using one or more other monomers, for example, a non-benzoxazole-containing diamine such as 1,4-phenylenediamine or 4,4'-oxydianiline or 3,4'-oxydianiline.

A compound which has either a single functional group or a compound, which may have more than one functional group but only one of which reacts during the preparation of the polyamic acid (i.e., is monofunctional in the terms of making amic acid linkages), may also optionally be employed in preparing the polyamic acid. The other group or groups, while not reactive under the conditions used to prepare polyamic acid, may be reactive under different conditions. In terms of polyamic acid preparation, these compounds act as chain terminators or "end-capping" agents. As chain terminators, the use of end-capping agents may reduce the molecular weight of the polyamic acid which might otherwise be obtained using the aromatic dianhydride and diaminobenzoxazole but the inherent viscosity of the polyamic acid should still be at least 2 dL/g. Useful end-capping agents include maleic anhydride, 2,3-dimethylmaleic anhydride, 3-(3-phenylethynlphenoxy) aniline, phenylethynlaniline, nadic anhydride, phthalic anhydride, aniline, propargylamine, vinyl phthalic anhydride, ethynylaniline, and 4-aminobenzocyclobutene.

These optionally employed monomers may be added to the reaction mixture prior to or during the reaction of the aromatic dianhydride and diaminobenzoxazole. In general, when employed, the monomers are employed in an amount from about 0.01 to about 50, preferably from about 0.1 to about 20, more preferably in an amount from about 0.2 to about 5, mole percent based on the total moles of aromatic dianhydride and diaminobenzoxazole employed.

The molecular weight of the polyamic acid can be expressed, albeit indirectly, in terms of its inherent viscosity. Inherent viscosity ("IV") is expressed as:

$$\eta_{inh} = \ln(\eta_{rel})/c$$

wherein $\eta_{rel}$ is the relative viscosity or $t/t_o$ where t is the flow time for the polyamic acid solution and $t_o$ is the flow time for the pure solvent, and c is concentration of polyamic acid polymer in solution, given in grams per deciliter. The units for IV are deciliters per gram ("dL/g"). Measuring inherent viscosity of the polyamic acid solution is also a means of determining when the reaction is complete. For the purposes of this invention, reaction is presumed complete when the inherent viscosity does not increase between two measurements taken at least twelve hours apart.

The polyamic acids of the present invention exhibit an inherent viscosity of greater than 2.0 dL/gram, as measured at a solution concentration of 0.2 g/dL in N-methylpyrrolidinone at 25° C. At these relatively high inherent viscosities, the physical and chemical properties, such as one or more of tensile strength, tensile modulus, coefficient of thermal expansion and elongation-at-break, have been generally found to be excellent without the need for any further polymerization. More preferably, the polyamic acid exhibits an inherent viscosity of greater than about 2.5 dL/gram, most preferably greater than about 3.0 dL/gram, highly preferably greater than about 4.0 dL/gram, more highly preferably greater than about 5.0 dL/gram, and most highly preferably greater than about 6.0 dL/gram.

Solutions of polyamic acid preferably have a viscosity of no more than about 500,000 centipoise.

Following preparation, the polyamic acid, generally without subsequent isolation, is converted to polyimidebenzoxazole. While any method which converts the polyamic acid to the polyimidebenzoxazole can be employed in the practice of the present invention, the polyamic acid solutions are generally heated to a temperature sufficient to cause the closure of amic acid linkages; thereby converting the polyamic acid to polyimidebenzoxazole. The ring-closing reaction will form water and the total amounts of water generated increases as the reaction proceeds. While not bound by theory, the ring closure of amic acid linkages to form imide-linkages can theoretically be represented by the reaction scheme:

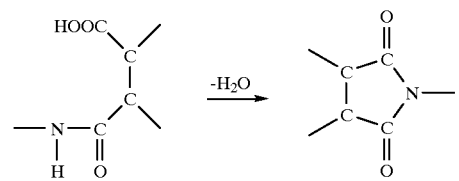

Temperatures which can be employed while converting the polyamic acid to PIBO can vary from about −10° C. to about 600° C. The reaction time required to convert the polyamic acid to the desired PIBO product ranges from as little as about 5 minutes or less to as much as about 200 hours or more. Selection of specific temperatures and times are dependent upon a number of factors including the composition of the polyamic acid, the solvent, and concentration of polyamic acid in the solvent and the desired PIBO product.

In the preferred method of the present invention, at least a portion of the liquid organic reaction medium (solvent) is removed from the polyamic acid solution and the polyamic acid then subjected to a temperature sufficient to convert the polyamic acid to PIBO. To remove the necessary amounts of the solvent from the polyamic acid solution, the solution can be contacted with a non-solvent for the polyamic acid such as water, methanol, acetone or other liquid; heated to a temperature to volatilize the solvent; or a combination of both.

In general, sufficient amounts of the solvent are removed from the polyamic acid such that less than about 60 percent remains based on the weight of the solvent and the polyamic acid. Preferably, sufficient amounts of solvent are removed such that there is less than about 45, more preferably less than about 35, percent solvent remaining based on the weight of the solvent and polyamic acid. The polyamic acid typically binds some of the solvent until imidization; thereby making it difficult to remove sufficient solvent to reduce the solvent level by volatilization to below about 10 weight percent. In general, the polyamic acid solution is advantageously heated to remove at least a portion of the solvent and then subjected to a temperature sufficient to convert the polyamic acid to PIBO; at which time essentially all the solvent is removed. In the preferred method, the solvent is volatilized at a temperature of less than about 150° C. to remove the desired amount of solvent and then heated to an imidization temperature of from about 160° C. to about 240° C. for a period sufficient to convert at least a portion of the polyamic acid to polyimidebenzoxazole.

In general, the solvent is vaporized at a vaporization temperature from about 50° C. to about 130° C., with the vaporization temperature(s) most advantageously employed within this range being dependent on a number of factors, particularly the vapor pressure/boiling point of the specific solvent employed. For example, a temperature of at least 50° C. is preferred when the solvent is N,N-dimethylacetamide and a temperature of at least 80° C. is preferred when the solvent is N-methylpyrrolidinone. This temperature may be achieved by steadily increasing the temperature to the desired value (known as "ramping") or by exposure to a constant heat source set at the desired temperature. In many applications, the polyamic acid is kept at a vaporization temperature until it resembles more of a solid, shaped article than a polymer solution. The time the polyamic acid is heated at the vaporization temperature is dependent on a variety of factors including the solvent, percent solids, solution viscosity, exhaust rate, and the presence or absence of a coagulating fluid and chemical ring-closing agents, but, in general, a minimum of about 5 minutes is generally required with a maximum being less than about two hours.

The polyamic acid is then heated to an imidization temperature from about 160° C. to about 240° C. to convert at least a portion of the polyamic acid into polyimidebenzoxazole. In general, the temperature of the polyamic acid is increased from the vaporization temperature to the imidization temperature as quickly as possible. Preferably, the transition from an environment at the vaporization temperature to an environment at the conversion temperature should take less than about 30, preferably no more than about 10, and most preferably no more than about 5 minutes.

The imidization temperature and time to which the polyamic acid is exposed is dependent on a variety of factors, including the specific polyamic acid being processed, the desired PIBO properties, and the article being prepared. For example, in the preparation of a film coated on a support substrate, the substrate reduces the cracking, tearing, and breaking of the film during imidization which may occur if no support is employed. As such, the conversion temperature and method of imidization in preparing a supported film are not as critical as when an unsupported film is being prepared. In preparing an unsupported film, the conversion temperature is more advantageously quickly achieved to minimize these defects. In general, an imidization temperature from about 160° C. to about 280° C., more preferably from about 185° C. to about 240° C., and most preferably to about 230° C. is employed. The polyamic acid is kept at the imidization temperature(s) until the desired conversion is obtained. In general, this requires at least about 5 and no more than about 90, preferably from about 10 to about 80, more preferably from about 15 to about 75, minutes. The conversion of polyamic acid to PIBO is preferably conducted in an atmosphere of air or an inert gas that is preferably moisture free.

While the polyamic acid is converted to PIBO at the imidization temperature, in the practice of the present invention, to further improve PIBO properties, the polyamic acid is preferably further treated by exposure to a temperature from about 250° C., preferably from about 300° C., to a temperature which is less than about 600° C. and less than the glass transition temperature of the resulting polyimidebenzoxazole, for at least about 10 seconds. Preferably, the product is maintained at this elevated temperature for a sufficient period of time to ensure sufficiently complete conversion of the amic acid and/or isoimide linkages into imide linkages and until the desired PIBO properties are obtained. This further heat-treatment increases certain film properties such as tensile strength and/or elongation-at-break. If possible without exceeding the glass transition temperature, by sequentially increasing these subsequent heat-treating temperatures, the properties of the resulting PIBO, particularly the tensile strength and percent elongation-at-break, can unexpectedly be improved. For example, the polyamic acid/PIBO can be heated at a first lower temperature such as from about 250° C. to about 350° C. in air or an inert atmosphere, and then at a second temperature, higher than the first temperature, preferably from about 350° C. to about 500° C., in air or an inert atmosphere, most preferably in a nitrogen atmosphere.

In preparing PIBO articles, if the PIBO product is not soluble in the solvent for the polyamic acid, the polyamic acid solution is formed into the desired shape of the finished product such as a film, fiber or other article using conventional techniques, such as extrusion, before substantial conversion of the polyamic acid to PIBO, i.e., either before or during the removal of solvent. If the PIBO product is soluble in the solvent, it is not normally necessary and may not be desirable to pre-shape the polyamic acid solution. While the polyamic acid can be removed from solution and redissolved in another solvent, the polyamic acid is preferably processed directly from the organic liquid reaction solution (diluted, if necessary, with additional amounts of the same or compatible solvent).

Shaping the polyamic acid solution to form a film can be done by coating, casting, dipping, or spraying the polyamic acid solution onto an appropriate substrate and imidizing the polyamic acid either partially or completely. The film may be removed either before or after the imidization reaction. Films as thin as 1 micrometer, preferably having a thickness from about 1 to about 2000 micrometers, can be made. Appropriate non-reactive substrates include materials such as glass, aluminum, stainless steel, silicon, copper, polyimide film and tetrafluoroethylene fluorocarbon polymers (marketed as Teflon™) to form a supported film. Often, a release agent such as Fluoroglide™ or IMS Silicone Spray No. S316 is used to facilitate removal of the film from the substrate.

Alternatively, the PIBO can permanently coat these or other substrates, either as a single layer coating or as a coating applied in multiple layers. The polyamic acid solution can be applied at essentially any coating thickness and relatively thick coatings of up to 2000 micrometers can be prepared. While the desired thickness of the PIBO coating depends on the end-use application, it will generally vary from about 0.1 to about 100 micrometers. The coated substrates can be prepared using a variety of techniques well known in the art for coating liquid solutions on a substrate and include spraying, or spin- or dip-coating the polyamic acid solution onto a clean substrate. To improve the adhesion of the PIBO to the substrate, an adhesion promoter such as 3-aminopropyltriethoxysilane can optionally be employed.

The thickness at which the polyamic acid solution is applied as coating depends on the viscosity of the polyamic acid solution. In general, for any given polyamic acid, the coating thickness is reduced as the viscosity of the polyamic acid solution is reduced. The viscosity most preferably employed will depend on a variety of factors including the desired thickness of the coating and the coating techniques. For example, using spin-coating techniques to prepare coatings of less than 100 micrometers, the viscosity of the polyamic acid solution (as measured by a Brookfield viscometer at 25° C.) is preferably less than about 15,000 centipoise (cps), more preferably less than about 10,000 cps. Viscosity reduction can be achieved by simply diluting the polyamic acid solution to a desired viscosity.

One method for preparing multiple layered PIBO coatings involves applying a polyamic acid solution, volatilizing the solvent, applying another layer of polyamic acid solution and volatilizing the solvent, and repeating this process until such time as the desired thickness is obtained. The polyamic acid is then converted to PIBO. Alternatively, a multilayer coating can be prepared using a step-wise technique of repeated application and imidization of individual polyamic acid layers until the desired level of coating thickness has been applied. An optional adhesion promoter can be applied between layers. These types of thin PIBO coatings are useful for electrical insulating purposes and environmental resistance.

While the reaction of the polyamic acid to form PIBO is effectively conducted by merely heating the polyamic acid, imidization can be conducted in the presence of a material or combination of materials which facilitates or accelerates ring closing (e.g., converts the amic acid linkages into imide linkages by catalyzing ring closure via dehydration). Of these materials, those whose by-products can be removed after or during imidization by vaporization and/or washing are most preferred. Materials which can be employed include dehydration agents such as acetic anhydride and other materials listed in column 5 of U.S. Pat. No. 3,410, 826, which is incorporated by reference; with the preferred materials being acetic anhydride, propionic anhydride, ketene, and isobutyric dianhydride. While these materials can be employed alone, they are most preferably employed with an organic base, preferably those which do not form inorganic salts, which facilitate ring-closing activity such as picoline, pyridine, isoquinoline, triethylamine, lutidine or their mixtures, and other materials listed in the previously incorporated reference in column 6 of U.S. Pat. No. 3,410, 826. These ring-closing agents (i.e., the dehydrating agent and organic base) are generally mixed together before use, although they can be added separately to the polyamic acid solution.

While the amount of ring-closing agent most advantageously employed is dependent on a variety of factors, including the specific ring-closing agent(s) employed, the desired reaction times and temperatures and the PIBO being prepared, the dehydration agent is preferably employed in an amount of more than about 10, more preferably more than about 100, and most preferably at least about 200, mole percent, preferably being used in an amount of less than about 500, more preferably less about 400, mole percent, said mole percent being based on the moles of dehydration agent per mole of amic acid linkages. The catalyst is employed in an amount of about 1 to about 200, preferably from about 10 to about 150, more preferably from about 20 to about 100, mole percent based on the theoretical maximum number of moles of amic acid linkages. The theoretical maximum number of polyamic acid linkages is easily determined by the moles of dianhydride employed.

These ring-closing agents may by added to the polyamic acid solution before or during solvent removal or subsequent reaction. The temperature of the polyamic acid solution and ring-closing agents are advantageously adjusted to a temperature of from about −20° C. up to about 140° C., more preferably from about −20° C. to about 50° C., most preferably from about −20° C. to about 15° C. prior to mixing to minimize gelation or rapid build-up of viscosity of the polyamic acid solution. While the ring-closing agents, if any, can be added neat to the polyamic acid solution, they are preferably added as a solution, preferably in a solution of from about 5 to about 50 weight percent, in an organic liquid which is compatible with the polyamic acid solution. Preferably, the solution of the ring-closing agents is prepared using the same solvent as employed in the polyamic acid solution.

The polyamic acid can first be formed into a desired shape and the shaped article contacted with a solution of the ring-closing agents, generally for a time of at least about 30 seconds but less than about 30 minutes. In general, once the polyamic acid has been contacted with the ring-closing agent, conversion of amic acid linkages to imide linkages begins, with the rate of conversion being temperature dependent.

In preparing PIBO articles, additives such as fillers, pigments, carbon black, conductive metal particles, abrasives and lubricating polymers are often advantageously employed. Conventional additives can be employed and the method of incorporating the additives is not critical. They can conveniently be added to the precursor solution prior to preparing the shaped article. The polyamic acid solution, alone or containing additives, may be applied by any of the usual techniques (doctoring, rolling, dipping, brushing, or spraying) onto a number of different substrates. If the PIBO polymer is prepared in solid form, the additives can be added to the solution prior to processing into a shaped article.

For PIBO which remains soluble in the organic liquid reaction medium, it is generally preferred to add the ring-closing agents directly to the polyamic acid solution, allow the reaction to proceed at slightly elevated temperatures, e.g., up to 50° C., but most preferably room temperature (about 20° C. to about 25° C.), followed by volatilization of the solvent and heat-treatment. In general, when the resulting PIBO is soluble, ring-closing agents are preferably employed.

The following examples are presented to illustrate the invention and should not be construed to limit its scope. In the examples, all parts and percentages are by weight unless otherwise indicated.

In these examples, inherent viscosities are measured by transferring an aliquot of the polyamic acid solution to a 25.0 mL volumetric flask and diluting with N-methylpyrrolidinone to achieve a solution concentration of about 0.2 g/dL. Solvent and solution flow times are measured at 25.0° C. using a Schott-Gerate CT 1450/AVS 310 viscometry apparatus in a Ubbelohde viscometer tube with an inner diameter of approximately 0.63 mm.

Tensile properties are measured according to ASTM D882. Adhesion is measured using a Cross-Hatch Tape Peel Adhesion Test. In such test, a coated wafer is scored using a surgical blade in a manner which produces 100 squares approximately 1 millimeter by 1 millimeter (mm). The coating is then attempted to be removed from the wafer using Scotch™ 810 tape and Scotch™ 600 tape. Four peels, two with each type tape, are conducted. The results are scored as number of squares pulled off by the tape per 100 squares. The lower the number, the better the adhesion of the film. The test is then repeated after the wafers are immersed in a 95° C. water bath for one hour and cooled to room temperature.

EXAMPLES 1–6

Into a 3-neck, 250-mL round-bottom flask equipped with agitation means and a Dean-Stark trap with a condenser is fed 28.9 mL of 1,3-dimethyl-2-imidazolidinone (DMI) and 14 mL of toluene. The flask is gently purged by nitrogen. Toluene is distilled off. Into the stirred, room-temperature solvent is added 3.042 g (8.8 mmol) of 2,6-(4,4'-diaminodiphenyl)benzo-[1,2-d:5,4-d']bisoxazole (DABO) containing 0.96 weight percent N-methylpyrrolidinone (NMP) and 1.919 g (8.80 mmol) of pyromellitic dianhydride (PMDA) with monomers rinsed down by 19 mL of dry N-methylpyrrolidinone. After about 16 hours, the resulting polyamic acid solution is diluted with 42.2 mL of a dry mixture of 60 volume percent DMI and 40 volume percent of NMP. Inherent viscosity (IV) is measured in NMP, at 25.0° C., and 0.2 g/dL. The results of this testing are shown in Table 1.

Similar polyamic acid solutions (Examples 2–6) are made using essentially the same techniques with varying amounts of DABO and PMDA as summarized in Table 1 and the IV tested. The results of this testing are shown in Table 1.

EXAMPLE 8

To a dry, 3-neck, 250-mL round-bottom flask having a nitrogen atmosphere and equipped with agitation means and inlet and outlet adaptors is added 84.3 g of the polyamic acid solution of Example 5. About 12.1 mL of a dry mixture of 60 volume percent 1,3-dimethylimidazolidinone and 40 volume percent N-methylpyrrolidinone (DMI/NMP) is added to the flask and stirred overnight at room temperature. The flask is chilled by an ice-water bath and degassed by aspirator vacuum. The flask is brought back to atmospheric pressure with nitrogen and a pressure equalizing dropping funnel attached. A mixture of 11.7 mL of DMI/NMP, 3.19 mL of acetic anhydride (AA), and 0.44 mL β-picoline is added, using the dropping funnel, to the stirred, chilled polyamic acid solution over about a 2-minute period. While still being chilled, the resulting mixture of polyamic acid and ring-closing agent is stirred for about 2 minutes and then degassed for about 6 minutes by aspirator vacuum while still chilled. The flask is brought to atmospheric pressure using nitrogen, closed and packed in ice.

A 4.25 percent solution of the resulting polyamic acid in NMP/DMI is cast onto a clean glass plate with a doctor blade with a 0.030" gap. The film is heated in an air-circulating oven at 80° C. for 1.5 hours. The film is removed from the glass and placed in 10 percent NMP, 63 percent acetic anhydride and 27 percent pyridine for 30 minutes. The film is secured in an aluminum frame, air-dried for about 10 minutes and placed in an air-circulating oven, heated for 20 minutes at 280° C., heated to 340° C. over a 20-minute period, and maintained at 340° C. for 1 hour. In a nitrogen atmosphere, the film is further heated for 27 minutes at 25° C., heated to 400° C. over a 75-minute period and maintained at 400° C. for 2 hours. The film exhibits a tensile

TABLE 1

| Example No. | DMI (mL) | T (mL) | DABO (mmol) | PMDA (mmol) | NMP (mL)* | DMI/NMP (mL) | IV |
|---|---|---|---|---|---|---|---|
| 1. | 28.9 | 14 | 3.042 g (8.8) | 1.919 g (8.8) | 19 | 42.2 | 4.5 |
| 2. | 51.4 | 25 | 5.383 g (15.62) | 3.407 g (15.62) | 33.7 | 74.9 | 3.3 |
| 3. | 44.5 | 30 | 4.696 g (13.62) | 2.971 g (13.62) | 26.7 + 3.0 | 98.4 | 6.6 |
| 4. | 43.1 | 28.8 | 4.540 g (13.19) | 2.878 g (13.19) | 25.6 + 2.9 | 88.3 | 5.7 |
| 5. | 300 | 200 | 31.620 g (91.759) | 20.014 g (91.759) | 180 + 20 | 349.8 | 6.1 |
| 6. | 21.6 | 10 | 2.266 g (6.572) | 1.433 g (6.572) | 14.2 | 31.5 | 3.4 |

*When total volume of NMP is written x + y, it means that x was added to DMI and toluene at the start of the reaction with y being used to rinse down the monomers. Larger flasks are utilized as needed and different lots of DABO monomers have different NMP contents which can be back-calculated from the data in the table.

EXAMPLE 7

A 5.5 weight percent solution in NMP/DMI of the polyamic acid of Example 5 is cast onto a clean glass plate using a doctor blade with a 0.76 mm gap. The film is heated in an air-circulating oven at 80° C. for 1.5 hours. The film is removed from the glass and placed in a solution of 35 percent acetic anhydride, 15 percent pyridine, and 50 percent toluene for 30 minutes, then washed twice with methanol. The film is secured in an aluminum frame and heated in a nitrogen atmosphere for 27 minutes at 30° C., then heated 45 minutes to 300° C., maintained at 300° C. for 1 hour, heated 30 minutes to reach 450° C., and maintained at 450° C. for 1 hour. The sample is then cooled. The film sample exhibits a tensile strength of about 35.6 Ksi (0.245 GPa); a tensile modulus of 1.26 Msi (8.69 GPa) and an elongation-at-break of about 9 percent.

strength of 44.1 Ksi (0.304 GPa); a tensile modulus of 2.33 Msi (16.1 GPa); and an elongation-at-break of 3.6 percent.

EXAMPLE 9

Oxidized 3" silicon wafers having one-half of the wafer copper coated are plasma-cleaned with oxygen for 15 minutes and dump-rinsed with water 3 times. The wafers are then spun-dried in air. The wafers are treated on the spin-coater with either 1 percent acetic acid in deionized water (identified as HOAc in Table 2), 1 percent acetic acid in deionized water and an adhesion promoter (identified as HOAc and APS in Table 2), or are not surface treated (identified as None in Table 2). A 5 weight percent polyamic acid solution of Example 6 in DMI/NMP is spin-coated on the wafer using a spread cycle of 500 rpm for 38 seconds and a spin-cycle of 3000 rpm for 30 seconds in a spin-caster. The polyamic acid coated wafers are heated to 60° C. for 15 minutes, heated at 225° C. for 5 minutes, and at 300° C. for 10 minutes. They are then cooled to room temperature overnight and their adhesion to the wafer evaluated. The results of this adhesion testing are reported in Table 2.

TABLE 2

| TREATMENT | SCORE | | SCORE after Immersion | |
|---|---|---|---|---|
| | Silicon | Copper | Silicon | Copper |
| None | 0 | 0 | 0 | 0 |
| HOAc | 0 | 0 | 3 | 0 |
| HOAc + APS | 0 | 0 | 0 | 0 |

EXAMPLES 10–16

Into a 3-neck, 250-mL round-bottom flask equipped with agitation means and a Dean-Stark trap with condenser is loaded 50.9 mL N,N-dimethylacetamide (DMAc), 20 mL toluene (T). The flask is gently purged by nitrogen via inlet and outlet adaptors. Toluene is distilled off. Into the stirred, room-temperature solvent is added 4.313 g (12.49 mmol) 2,6-(4,4'-diaminodiphenyl)benzo[1,2-d:5,4-d']bisoxazole (DABO) containing 0.89 weight percent NMP and 3.873 g (12.49 mmol) of 4,4'-oxydiphthalic anhydride (ODPA) with monomers rinsed down by 10.0 mL dry DMAc. After about 68 hours, the polyamic acid solution is diluted with dry 38.2 mL DMAc. The inherent viscosity (IV) of the resulting solution is measured and recorded in Table 3.

Similar polyamic acid solutions (Examples 11–16) are made using essentially the same techniques with varying amounts of DABO and ODPA as summarized in Table 3. The inherent viscosity of each of the resulting polyamic acid solutions is measured and recorded in Table 3.

TABLE 3

| Example No. | DMAc (mL)* | T (mL) | DABO (mmol) | ODPA (mmol) | DMAc dilute (mL) | IV |
|---|---|---|---|---|---|---|
| 10. | 50.9 | 20 | 4.313 g (12.49) | 3.873 g (12.49) | 38.2 | 2.4 |
| 11. | 95.8 + 15 | 25 | 7.830 g (22.72) | 7.048 g (22.72) | 48.6 | 2.3 |
| 12. | 76.8 + 3.2 | 20.8 | 5.645 g (16.41) | 5.091 g (16.41) | 22.9 | 2.5 |
| 13. | 470 + 30 | 1000 | 35.328 g (102.56) | 31.816 g (102.56) | 0 | 2.6 |
| 14. | 470 + 30 | 130 | 35.292 g (102.56) | 31.816 g (102.56) | 0 | 2.5 |
| 15. | 470 + 30 | 130 | 35.267 g (102.56) | 31.816 g (102.56) | 0 | 2.3 |
| 16. | 625 + 25 | 195 | 45.913 g (133.33) | 41.361 g (133.33) | 0 | 2.7 |

*Larger flasks are utilized as needed and different lots of DABO monomer have different NMP contents which can be back calculated from the data in the table.

EXAMPLE 17

In a similar manner to Example 9, three-inch oxidized wafers are prepared and a 10 percent solution of the polyamic acid of Example 10 in DMAc is spin-coated onto the wafers. The coated wafers are subjected to the same temperatures and tested for adhesion. The results of this adhesion testing are reported in Table 4.

TABLE 4

| TREATMENT | SCORE (initial) | | SCORE after Immersion | |
|---|---|---|---|---|
| | Silicon | Copper | Silicon | Copper |
| None | 100 | 0 | — | 0 |
| HOAc | 100 | 0 | — | 0 |
| HOAc + APS | 7 | 0 | 12 | 0 |

EXAMPLE 18

A 6"×6" piece of 0.005" thick aluminum foil is taped to a glass plate. A 12.5 percent solution of the polyamic acid of Example 13 in N,N-dimethylacetamide (DMAc) is cast onto the aluminum foil using a doctor blade with a 0.010" gap. The coated aluminum foil is then heated to 60° C. in an air-circulating oven for 30 minutes. The coated aluminum foil is removed from the glass and secured in a brass frame with a 5.5-inch-square opening. The coated aluminum foil is then exposed to an environment heated for 30 minutes at 60° C., heated to 225° C. for a 20-minute period, maintained at 225° C. for 15 minutes, heated to 300° C. over a 20-minute period, and maintained at 300° C. for 60 minutes.

The coated foil is removed from the oven, cooled and then, in a nitrogen atmosphere, heated for 27 minutes at 30° C., heated over 75 minutes to 350° C. and maintained at 350° C. for 2 hours. It is then cooled to room temperature. The resulting coating is bubble-free and 12 to 16 μm thick.

EXAMPLE 19

A 0.050" titanium panel is cleaned with an abrasive pad, soap and water, rinsed in water, rinsed in acetone, rinsed in 1,1,1-trichloroethane and dried. The titanium panel is held in place on a glass plate by 32 mil Teflon® fluorocarbon polymer shims. A 12.5 percent solution in DMAc of the polyamic acid of Example 14 is cast onto the titanium panel using a doctor blade with a 0.030" gap. The coated titanium panel is then placed in an air-circulating oven heated for 60 minutes at 60° C., heated for 30 minutes to 225° C., maintained at 225° C. for 20 minutes, heated for 20 minutes to 300° C., and maintained for 60 minutes at 300° C.

The titanium panel is removed from the oven and cooled. Using the tape peel test, the coating adheres well to the panel with no failures indicated.

Other coated titanium panels are prepared in the same manner and, after the thermal treatment in air, they are heated in nitrogen for 27 minutes at 30° C., heated for 75 minutes to 400° C., and maintained at 400° C. for 2 hours. It is then cooled to room temperature. The adhesion of the coating is excellent on these samples as well.

A piece of release-coated polyimide film (sold under the tradename Thermalimide®) is secured in an aluminum frame. Another sample of a 12.5 percent solution of the polyamic acid of Example 14 in DMAc is cast onto the film using a Teflon™ fluorocarbon polymer doctor blade with a 0.015" gap. The coated film is heated in an air-circulating oven for 60 minutes at 60° C., for 20 minutes at 225° C., 20 minutes ramp to 300° C., and 60 minutes at 300° C.

The PIBO film is peeled from the polyimide film and placed in a nitrogen atmosphere, heated for 27 minutes at 25° C., 75 minutes to 400° C., and maintained at 400° C. for 2 hours. It is then cooled to room temperature. The film exhibits a tensile strength of 39.0 Ksi (0.269 GPa), a tensile modulus 1.29 Msi (8.90 GPa), and an elongation-at-break of 9.7 percent.

Yet another 12.5 percent solution of the polyamic acid of Example 14 in DMAc is cast onto a clean silylated glass plate with a doctor blade with a 0.015" gap. The film is heated in an air-circulating oven at 60° C. for 1 hour. The film is removed from the glass and placed in a mixture of 35 percent acetic anhydride, 15 percent pyridine and 50 percent toluene for 30 minutes, then washed twice with methanol. The film is secured in an aluminum frame and placed in a nitrogen atmosphere heated for 27 minutes at 30° C., for 45 minutes to 300° C., maintained at 300° C. for 1 hour, heated for 30 minutes to 400° C., and maintained at 400° C. for 1 hour. It is then cooled to room temperature.

The film exhibits a tensile strength of 38.8 Ksi (0.267 GPa), a tensile modulus of 1.23 Msi (8.49 GPa), and an elongation-at-break of 18.4 percent.

EXAMPLE 20

A piece of heavy (5 mil) polished aluminum foil is secured in an aluminum frame. A 12.5 percent solution of the polyamic acid of Example 15 in DMAc is cast onto the foil using a Teflon™ fluorocarbon polymer doctor blade with a 0.010" gap. The coated film is placed in an air-circulating oven, heated for 45 minutes at 60° C., for 25 minutes to 225° C., maintained at 225° C. for 20 minutes, for 18 minutes to 300° C., and maintained at 300° C. for 60 minutes.

The film on the framed aluminum foil is removed from the oven and cooled. The aluminum foil is removed from the frame and the film on the foil is then placed in a nitrogen atmosphere, heated for 27 minutes at 30° C., for 75 minutes to 400° C., and maintained at 400° C. for 2 hours. The film is then cooled to room temperature.

The excess aluminum foil around the film is trimmed off and the film on the aluminum is placed into a stirred 10 percent aqueous solution of NaOH until the film lifts from the aluminum (about 1 hour). The film is then thoroughly rinsed with deionized water, wiped free of surface residues with damp towels and allowed to air-dry.

The film had a tensile strength of 33.8 Ksi (0.233 GPa), a tensile modulus of 1.17 Msi (8.07 GPa), and an elongation-at-break of 6.9 percent.

EXAMPLE 21

In a nitrogen atmosphere, 61.18 g of the polyamic acid solution of Example 16 is added to a dry, 3-neck, 250-mL round-bottom flask equipped with agitation means and inlet and outlet adaptors. To the flask is added 7.2 mL of dry N,N-dimethylacetamide (DMAc). The resulting mixture is stirred overnight at room temperature. The flask is chilled for 10 minutes in an ice-water bath and then, while remaining in the ice bath, degassed by an aspirator vacuum. The flask is brought back to atmospheric pressure with nitrogen and a pressure equalizing dropping funnel attached. A ring-closing agent composed of 2.3 mL acetic anhydride (AA) and 0.60 mL β-picoline in 8.7 mL of DMAc is added dropwise to the stirred, chilled polyamic acid solution over about a 3-minute period. The resulting solution is stirred for 4 minutes and then degassed for about 13 minutes by aspirator vacuum while still being chilled. The flask is brought to atmospheric pressure by using nitrogen, closed and packed in ice.

A 9.5 percent solution of the polyamic acid in DMAc is cast onto a clean glass plate with a doctor blade with a 0.010" gap. The film is heated in an air-circulating oven at 60° C. for 30 minutes, then removed from the glass and secured in an aluminum frame. The framed film is placed in an air-circulating oven, heated for 15 minutes at 225° C., heated for 20 minutes to 300° C., and maintained at 300° C. for 1 hour.

The film is further exposed to a nitrogen atmosphere, heated for 27 minutes at 25° C. ($N_2$ purge cycle), 75 minutes to 400° C., and then maintained at 400° C. for 2 hours. The film is then cooled to room temperature.

The PIBO film is approximately 12 μm thick and exhibits a tensile strength of 51.62 Ksi (0.356 GPa), a tensile modulus of 1.87 Msi (12.9 GPa), and an elongation-at-break of 9.9 percent.

EXAMPLE 22

Into a 3-neck flask similar to that used in Example 1, is added 60 mL of N,N-dimethylacetamide (DMAc) and 25 mL of toluene (T). The flask is gently purged by nitrogen via inlet and outlet adaptors. The toluene is distilled off. Into the room-temperature solvent is added 4.343 g (12.69 mmol) of 2,6-(4,4'-diaminodiphenyl)benzo[1,2-d: 5,4-d']bisoxazole (DABO), 0.0035 mL (0.038 mmol) aniline, and 3.738 g (12.70 mmol) of 3,3',4,4'-biphenyltetracarboxylic dianhydride (BPDA) with monomers rinsed down by 17.6 mL of dry DMAc. After about 68 hours, the polyamic acid solution is diluted with 21.0 mL of dry DMAc. After a reaction time of about 236 hours at room temperature, the inherent viscosity (IV) is measured as 2.76 dL/g (NMP, 25.0° C., 0.2 g/dL).

An 8 percent solution of the resulting polyamic acid in DMAc is cast onto a clean glass plate with a doctor blade with a 0.015" gap. The film is heated in an air-circulating oven at 50° C. for 2 hours. The film is removed from the glass and placed in a mixture of 35 percent acetic anhydride, 15 percent pyridine, and 50 percent toluene for 30 minutes, then washed twice with methanol. The film is secured to a tetrafluoroethylene fluorocarbon polymer support and dried for approximately 18 hours under ambient conditions. The film is removed from the support and placed onto a piece of aluminum foil. The film is exposed in a nitrogen atmosphere to 25° C. for 27 minutes ($N_2$ purge cycle), heated for 30 minutes to 100° C., maintained at 100° C. for 1 hour, heated for 30 minutes to 200° C., maintained at 200° C. for 1 hour, then heated for 30 minutes to 300° C., and maintained at 300° C. for 1 hour. The film is then cooled.

The resulting film is approximately 9 μm thick. The film is split into two pieces. The tensile properties of one piece are tested and the film found to exhibit a tensile strength of 27.4 Ksi (0.189 GPa), a tensile modulus of 1.24 Msi (8.56 GPa), and an elongation-at-break of 4 percent.

The other piece is exposed in a nitrogen atmosphere for 27 minutes at 25° C. ($N_2$ purge cycle), heated for 30 minutes to 350° C., and maintained at 350° C. for 2 hours. The film is then cooled. It exhibits a tensile strength of 34.75 Ksi (0.240 GPa), a tensile modulus of 1.29 Msi (8.90 GPa) and an elongation-at-break of 19.8 percent.

Another 8 percent solution of the polyamic acid in DMAc is cast onto a clean glass plate with a doctor blade with a 0.020" gap. The film is heated in an air-circulating oven at 60° C. for 1.5 hours. It is then removed from the glass and secured in an aluminum frame and heated for 10 minutes at 245° C., for 35 minutes to 350° C., and maintained at 350° C. for 30 minutes. It is then cooled to 100° C. and removed from the oven.

The film is then heated in a nitrogen atmosphere for 27 minutes at 25° C. ($N_2$ purge cycle), heated for 75 minutes to 400° C., and maintained at 400° C. for 2 hours. It is then cooled to room temperature. The film exhibits a tensile strength of 41.97 Ksi (0.290 GPa), a tensile modulus of 1.61 Msi (11.1 GPa), and an elongation-at-break of 8.7 percent.

EXAMPLE 23

In a manner similar to that of Example 22, a polyamic acid solution is prepared using an initial solvent feed of 103.4 mL of 1,3-dimethyl-2-imidazolidinone (DMI), 55.8 mL of N-methylpyrrolidinone (NMP), and 100 mL of toluene (T) and adding, after distilling off the toluene, 10.816 g (31.385 mmol) of 2,6-(4'-diaminodiphenyl)benzo[1,2-d:5,4-d'] bisoxazole (DABO) containing 0.65 weight percent NMP, 1.110 g (5.543 mmol) of 4,4'-oxydianiline (ODA), and 8.055 g (36.93 mmol) of pyromellitic dianhydride (PMDA) with monomers rinsed down by 13.1 mL of dry N-methylpyrrolidinone (NMP). The viscous solution is diluted with a total of 83.1 mL of a dry mixture of 60 volume percent DMI and 40 volume percent NMP. After about 68 hours' reaction time at room temperature, the inherent viscosity of the reaction product is measured as 4.65 dL/g (NMP, 25.0° C., 0.2 g/dL).

In a manner similar to that of Example 8, 57.60 g of the resulting polyamic acid solution is stirred overnight with 6.1 mL of a dry mixture of 60 volume percent DMI and 40 volume percent NMP. The flask is chilled by an ice-water bath and degassed by aspirator vacuum. After the flask is brought back to atmospheric pressure with nitrogen, a mixture of 9 mL of 60 percent DMI and 40 percent NMP, 2.78 mL of acetic anhydride, and 0.38 mL of β-picoline is added dropwise to the stirred, chilled polyamic acid over a 2-minute period. The resulting mixture is stirred for 2 minutes and then degassed for about 6 minutes while still chilled. The flask is brought to atmospheric pressure using nitrogen.

A 5.5 percent solution of the polyamic acid in NMP/DMI is formed into a film in a manner similar to Example 21, except the solution is cast onto a clean, silylated glass plate at 0.030" and heated in the air-circulating oven for 1 hour at 80° C., and then in a nitrogen atmosphere for 27 minutes at 25° C. ($N_2$ purge cycle), 45 minutes to 280° C., maintained at 280° C. for 20 minutes, heated for 20 minutes to 350° C., maintained for 1 hour at 340° C., heated for 30 minutes at 400° C., and maintained for 1 hour at 400° C.; then cooled to room temperature.

The film exhibits a tensile strength of 36.7 Ksi (0.253 GPa), a tensile modulus of 2.01 Msi (13.9 GPa) and an elongation-at-break of 2.8 percent.

EXAMPLE 24

In a manner similar to that of Example 22, a polyamic acid solution is prepared using an initial solvent feed of 234.7 mL of 1,3-dimethyl-2-imidazolidinone (DMI), 136.5 mL of N-methylpyrrolidinone (NMP), and 100 mL of toluene (T). Into the stirred, room-temperature solvent, after distilling off the toluene, is added 22.209 g (64.57 mmol) of 2,6-(4,4'-diaminodiphenyl)benzo[1,2-d:5,4-d']bisoxazole (DABO) containing 0.45 percent NMP, 4.31 g (21.53 mmol) of 4,4'-oxydianiline (ODA), and 18.781 g (86.10 mmol) of pyromellitic dianhydride with monomers rinsed down by 20 mL of dry N-methylpyrrolidinone (NMP). The viscous solution is diluted with a total of 355.5 mL of dry 60 percent DMI and 40 percent NMP. After about 116 hours' reaction time at room temperature, a reaction aliquot has its inherent viscosity (IV) measured. IV=5.51 dL/g (NMP, 25.0° C., 0.2 g/dL).

In a manner similar to that of Example 8, 41.87 g of the resulting polyamic acid solution is stirred overnight with 12.2 mL of a dry mixture of 60 volume percent DMI and 40 volume percent DMI/NMP. After the flask has been chilled in an ice-water bath, degassed and brought back to atmospheric pressure using nitrogen, a mixture composed of 5.8 mL of 60 percent DMI and 40 percent NMP, 1.67 mL of acetic anhydride, and 0.23 mL of β-picoline is added dropwise to the stirred, chilled polyamic acid over about a 1-minute period. The resulting mixture is stirred for 2 minutes and then degassed while still chilled. The flask is brought to atmospheric pressure using nitrogen.

In a manner similar to Example 7, a 3.8 percent solution of the resulting polyamic acid in NMP/DMI is cast onto a clean, silylated glass plate with a doctor blade having a 0.03" gap and formed as a film except that, after being washed with methanol, the resulting film is heated in an air-circulating oven for 1 hour at 300° C. and then exposed to a nitrogen atmosphere, heated for 27 minutes at 25° C. ($N_2$ purge cycle), for 75 minutes to 400° C., maintained at 400° C. for 1 hour and subsequently cooled. The resulting film exhibits a tensile strength of 38.2 Ksi (0.264 GPa), a tensile modulus of 1.42 Msi (9.80 GPa), and an elongation-at-break of 12.2 percent.

EXAMPLE 25

A polyamic acid solution is prepared in a manner identical to Example 24. A 4 percent solution of the polyamic acid in DMI/NMP is cast on a clean glass plate with a doctor blade with 0.020" gap. The polymer is coagulated from solution by immersing the coated glass plate in methanol for 10 minutes. The resulting film is collected and imidized by immersing it for 5 minutes in a mixture of 700 mL acetic anhydride, 300 mL pyridine, and 1000 mL toluene. The film is washed in methanol for 10 minutes. The film is then framed onto an aluminum frame and air-dried for 45 minutes at ambient conditions. The air-dried film is placed in an air-circulating oven, heated for 50 minutes at 225° C., for 30 minutes to 300° C., and maintained at 300° C. for 1.5 hours.

The film is removed from the oven and cooled to room temperature. The film is then exposed, in a nitrogen atmosphere, heated for 27 minutes at 30° C., 75 minutes to 400° C., maintained at 400° C. for 2 hours, and then cooled.

The resulting film has a tensile strength of 41.5 Ksi (0.286 GPa), a tensile modulus of 1.47 Msi (10.1 GPa), and an elongation-at-break of 11.3 percent.

EXAMPLE 26

A polyamic acid solution is prepared in a manner similar to Example 1 except that the initial solvent is 135 mL N,N-dimethylacetamide (DMAc) and 50 mL toluene (T). After the toluene is distilled off, 9.737 g (43.23 mmol) of 5-amino-2-(p-aminophenyl)-benzoxazole (pDAMBO) and 9.429 g (43.23 mmol) of pyromellitic dianhydride (PMDA) rinsed down by 15 mL dry DMAc is added. A total of 34.1 mL of DMAc. is used to dilute the viscous solution. After about 44 hours, an aliquot of the polyamic acid solution is found to have an inherent viscosity (IV) of 4.31 dL/g (NMP, 25.0° C., 0.2 g/dL).

In a manner similar to Example 8, 54.15 g of the resulting polyamic acid solution is stirred overnight with 7.2 mL of dry DMAc at room temperature. After the flask is chilled and degassed, brought back to atmospheric pressure with nitrogen, a mixture of 7.2 mL (DMAc), 2.49 mL acetic anhydride, and 0.66 mL β-picoline is added dropwise to the stirred, chilled polyamic acid over a 1-minute period. The resulting mixture is stirred for about 3.5 minutes and then degassed for about 8 minutes. The flask is brought to atmospheric pressure using nitrogen.

In a manner similar to Example 8, a portion of the resulting mixture is cast as a 0.030" film which is placed in an air-circulating oven heated at 60° C. for 90 minutes. The film is removed from the glass and secured in an aluminum frame, then heated for 27 minutes at 225° C., 18 minutes to 300° C., and maintained at 300° C. for 90 minutes. The film is then exposed, in a nitrogen oven, to a temperature of 300° C. for 27 minutes then heated to 400° C. over 75 minutes and maintained at 400° C. for 2 hours. The resulting film exhibits tensile strength of 57.8 Ksi (0.399 GPa), a tensile modulus of 1.61 (11.1 GPa), and an elongation-at-break of 21.1 percent.

EXAMPLE 27

A polyamic acid solution is prepared in a manner similar to Example 1 except that the initial solvent is 78.8 mL 1,3-dimethyl-2-imidazolidinone (DMI), 37.5 mL N-methylpyrrolidinone (NMP) and 50 mL toluene (T). After the toluene is distilled off, 9.907 g (43.98 mmol) of 5-amino-2-(p-aminophenyl)benzoxazole (pDAMBO) and 9.593 g (43.98 mmol) of pyromellitic dianhydride (PMDA) rinsed down with 15 mL of dry NMP is added to the solvent at room temperature. A total of 100 mL of a dry mixture of 60 percent DMI and 40 percent NMP is used to dilute the viscous solution. After about 44 hours, the inherent viscosity of the polyamic acid is 3.53 dL/g (NMP, 25.0° C., 0.2 g/dL).

A 7.5 weight percent solution of polyamic acid solution is cast as a 0.02 in. film. The film layer is coagulated in a mixture of 700 mL acetic anhydride, 300 mL pyridine, and 1000 mL toluene. The coagulated film is then washed in methanol for 15 minutes. The film is framed and placed in an air-circulating oven, heated for 50 minutes at 225° C., then for 20 minutes to 300° C., and maintained for 60 minutes at 300° C. It is then cooled to room temperature and heated, in a nitrogen atmosphere, at 400° C. for 2 hours. The resulting film exhibits a tensile strength of 47.6 Ksi, (0.328 GPa), tensile modulus of 1.23 Msi, (8.49 GPa) and an elongation-at-break of 25.9 percent.

EXAMPLE 28

In a manner similar to Example 1, a polyamic acid solution is prepared using an initial feed of 61.5 mL N,N-dimethylacetamide (DMAc) and 20 mL toluene, with the polyamic acid made using 4.974 g (22.08 mmol) of 5-amino-2-(p-aminophenyl)benzoxazole (pDAMBO) and 6.850 g (22.08 mmol) of 4,4'-oxydiphthalic anhydride (ODPA) rinsed with 10.0 mL dry DMAc. After 68 hours, the resulting polyamic acid is diluted with N-methylpyrrolidinone (NMP) and has an inherent viscosity of 2.67 dL/g (0.203 g/dL, 25.0° C.).

In a manner similar to Example 8, 78.8 g of the polyamic acid is chilled and degassed. After the flask is returned to atmospheric pressure using nitrogen, 16.7 mL DMAc, 4.37 mL acetic anhydride, and 1.16 mL β-picoline are added dropwise to the stirred, chilled PA for 2.25 minutes. The resulting mixture is then degassed for 15.0 minutes and returned to atmospheric pressure using nitrogen.

A 12.5 percent solution of the resulting polyamic acid in DMAc is cast as a 0.015" film. The film is heated in an air-circulating oven at 60° C. for 45 minutes, removed from the glass and secured in an aluminum frame. It is then placed in an air-circulating oven, heated for 20 minutes at 225° C., for 20 minutes to 300° C., maintained for 1 hour at 300° C., then cooled to room temperature; and, in a nitrogen atmosphere, heated for 27 minutes at 30° C. ($N_2$ purge cycle), 75 minutes to 400° C., maintained at 400° C. for 2 hours, and then cooled to room temperature.

The film's tensile strength is 44.11 Ksi (0.304 GPa), its tensile modulus is 1.04 Msi (7.18 GPa), and its elongation-at-break 22.6 percent.

EXAMPLES 29–46

Following the procedure of Example 28 except using the amounts of solvent and reactants set forth in Table 5, a series of films are prepared. The tensile properties of these films are tested and reported in Table 5.

TABLE 5

| Example No. | Initial Solvent, mL[1] | Reactants, g[2] | R, Time, hrs. | IV. dL/g | Polyamic Acid Solution, g | Catalyst Mixture, mL[3] | Heat Cycle[4] | | Tensile Properties[5] | | |
|---|---|---|---|---|---|---|---|---|---|---|---|
| | | | | | | | Air | $N_2$ | T.S. | T.M. | Elong |
| 29 | 60 + 5 DMAc 20 T | 3.616 mDAMBO 7.132 6-FDA | 20 | 2.31 | 71.6 | 15.1 DMAc 3.15 AA 0.83 B—P | 20/225 20/60/300 | None | 13.5 (0.093) | 0.56 (3.86) | 3.4 |
| 30 | 67.5 + 5 NMP 15 T | 4.581 pDAMBO 5.984 BPPA | 116 | 2.18 | — | None | 25/225 20/60/300 | 27/30 75/120/400 | 34.9 (0.241) | 1.02 (7.03) | 11.2 |
| 31 | 52.5 + 7.5 DMAc 15 T | 4.080 mDAMBO 3.951 PMDA | 44 | 5.3 | 75.6 | 10.1 DMAc 3.04 AA 0.80 B—P | 20/225 20/60/300 | None | 18.1 (0.125) | 0.59 (4.07) | 8.8 |
| 32 | 135 + 15 DMAc 50 T | 9.574 mDAMBO 15.229 DSDA | 44 | 3.34 | 74.36 | 12.2 DMAc 3.89 AA 1.04 B—P | 20/225 20/60/300 | None | 17.0 (0.117) | 0.55 (3.8) | 4.6 |
| 33 | 270 + 76.8 DMAc 100 T | 19.761 DABO 20.536 DSDA | 40 | 3.94 | 79.5 | 18.9 DMAc 2.55 AA 0.68 B—P | 20/225 20/60/300 | None | 23.4 (0.161) | 0.68 (4.7) | 11.5 |
| 34 | 23 + 5 DMAc | 2.107 | 44 | 2.66 | — | None | 20/225 | None | 13.4 | 0.42 | 6.7 |

TABLE 5-continued

| Example No. | Initial Solvent, mL[1] | Reactants, g[2] | R, Time, hrs. | IV. dL/g | Polyamic Acid Solution, g | Catalyst Mixture, mL[3] | Heat Cycle[4] | | Tensile Properties[5] | | |
|---|---|---|---|---|---|---|---|---|---|---|---|
| | | | | | | | Air | N$_2$ | T.S. | T.M. | Elong |
| | 10 T | 6FA[DAMBO]$_2$ 0.808 PMDA | | | | | 20/60/300 | | (0.092) | (2.9) | |
| 35 | 67.5 + 7.5 NMP 15 T | 4.581 pDAMBO 5.984 BPDA | 116 | 2.18 | 37.6 | 5.2 NMP 1.77 AA 0.47 B—P | 20/225 20/60/300 | 27/30 75/120/400 | 48.9 (0.337) | 1.18 (8.14) | 21.2 |
| 36 | 50 + 7.6 NMP 20 T | 4.550 pDAMBO 5.943 BPDA | 116 | 2.81 | — | None | 20/225 20/60/300 | None | 20.7 (0.143) | 0.70 (4.83) | 14.0 |
| 37 | 62.5 + 21.6 NMP 25 T | 5.160 mDAMBO 10.178 6FDA | 44 | 3.69 | 102.2 | 10.0 NMP 4.6 AA 1.22 B—P | 20/225 20/60/300 | None | 15.1 (0.104) | 0.48 (3.31) | 4.7 |
| 38 | 193 + 102.3 NMP 50 T | 15.333 mDAMBO 30.241 6FDA | 44 | 4.22 | — | None | 60/100 60/200 60/300 | None | 18.2 (0.126) | 0.50 (3.45) | 6.0 |
| 39 | 60 + 10 DMAc 20 T | 3.195 pDAMBO 3.094 PMDA | 68 | 3.48 | — | None | 20/225 20/60/300 | None | 26.6 (0.183) | 1.46 (10.1) | 2.9 |
| 40 | 183.7 + 104.9 NMP 40 T | 14.6 pDAMBO 14.1 PMDA | 44 | 3.43 | — | None | 60/240 20/60/350 | None | 26.0 (0.179) | 1.51 (10.4) | 2.7 |
| 41 | 183.7 + 104.9 NMP 40 T | 14.578 pDAMBO 14.116 PMDA | 44 | 3.43 | — | None | 25/225 20/60/300 | 27/30 75/120/400 | 41.9 (0.289) | 1.44 (9.9) | 6.8 |
| 42 | 230 + 74.9 NMP 40 T | 12.976 pDAMBO 12.565 PMDA | 68 | 3.73 | — | None | 25/225 20/60/400 | 27/30 75/120/400 | 44.6 (0.308) | 1.59 (11.0) | 8.5 |
| 43 | 230 + 74.9 NMP 40 T | 12.979 pDAMBO 12.565 PMDA | 68 | 3.73 | 76.24 | 5.3 NMP 2.63 AA 0.70 B—P | 25/225 20/60/300 | 27/30 75/120/400 | 57.8 (0.399) | 1.42 (9.79) | 15.8 |
| 44 | 75 + 18.6 NMP 25 T | 4.450 TA(DAMBO)$_2$ 2.836 PMDA | 68 | 3.98 | 103.9 | 11.8 NMP 2.59 AA 0.69 B—P | 20/225 20/60/300 | 27/30 75/120/400 | 3.85 (0.266) | 1.22 (8.41) | 6.7 |
| 45 | 75 + 8.7 NMP 25 T | 4.167 mDAMBO 5.443 BPDA | 140 | 3.15 | 96.0 | 12.8 NMP 3.36 AA 0.96 B—P | 20/225 20/60/300 | None | 22.4 (0.155) | 0.61 (4.21) | 7.2 |
| 46 | 62.5 + 7.5 NMP 25 T | 4.293 pDAMBO 8.467 6FDA | 44 | 3.11 | 85.0 | 12.4 NMP 3.81 AA 1.01 B—P | None | 27/30 60/225 140/300 | 16.4 (0.113) | 0.51 (3.52) | 7.7 |

[1]Initial solvent is recited in abbreviated form with NMP being N-methylpyrrolidinone, T being toluene and DMAc being dimethylacetamide. The first number is the amount, in mL, used as the reaction medium and the second, the amount to rinse the reaction product.
[2]Reactants are recited in abbreviated form with mDAMBO: 5-amino-2-(m-aminophenyl)benzoxazole; ODPA: 4,4'oxydiphthalic dianhydride; pDAMBO: 5-amino-2-(p-aminophenyl)benzoxazole; PMDA - pyromellitic dianhydride; 6FDA: 2,2-bis-(3,4-dicarboxyphenyl)hexafluoropropane dianhydride; DSDA: 3,3',4,4'-diphenylsulfonetetracarboxylic dianhydride; DABO: 2,6-(4,4'-diaminodiphenyl)benzo[1,2-d:5,4-d']bisoxazole; BPDA: 3,3',4,4'-biphenyltetracarboxylicdianhydride; TA(DAMBO)$_2$: 2,2'-p-phenylenebis(5-aminobenzoxazole); 6FA(DAMBO)$_2$: 2,2-bis(4-phenyl)hexafluoropropane-2,2'-bis(5-aminobenzoxazole).
[3]Catalyst mixture is recited in abbreviated form with DMAc: N,N-dimethylacetamide; AA: acetic anhydride: B—P: β-picoline; NMP: N-methylpyrrolidinone.
[4]Heat cycle is recited as the heating in air or nitrogen with the cycle being recited as time in minutes at a specific temperature in ° C.; with a notation 20/60/300, or similar notation, meaning the sample was exposed for 20 minutes to an oven being heated to 300° C. and then maintained at 300° C. for 60 minutes. Air heating is conducted first and nitrogen subsequently when both air and nitrogen heating is conducted.
[5]Tensile properties are reported as tensile strength (T.S.) in Ksi (GPa), the tensile modulus (T.M.) in Msi (GPa), and Elongation-at-break (Elong.) in percent.

EXAMPLE 47

In a manner similar to Example 1, 1.158 g (5.143 mmol) of 5-amino-2-(m-aminophenyl)benzoxazole and 2.285 g (5.143 mmol) of 2,2-bis(3,4-dicarboxyphenyl)-hexafluoropropane dianhydride is added to an initial feed of 15.7 mL of N-methylpyrrolidinone (NMP) and 10 mL toluene. After 44 hours' reaction, the resulting polyamic acid has an inherent viscosity of 2.20 dL/g (0.202 g/dL, 25.0° C.). The flask is chilled with an ice-water bath and a solution of 3.2 mL NMP, 1.17 mL acetic anhydride, and 0.30 mL β-picoline is added dropwise to the stirred, chilled flask over 5 minutes. The reaction mixture is allowed to warm to room temperature and is stirred 68 hours at room temperature.

The resulting solution is cast as a 0.5 mm film on a glass plate. The film is heated in an air-circulating oven at 100° C. for 1.0 hour, removed from the glass and secured in an aluminum frame. It is then placed in an air-circulating oven, heated at 225° C. for 20 minutes, heated for 20 minutes to 300° C., maintained at 300° C. for 1.0 hour, and then cooled to room temperature.

The resulting film exhibits a tensile strength of 18.3 Ksi (0.126 GPa), a tensile modulus of 482.9 Msi (3.33 GPa), and an elongation-at-break of 22.2 percent.

EXAMPLE 48

In a manner similar to Example 1, 1.533 g (6.807 mmol) of 5-amino-2-(p-aminophenyl)benzoxazole (pDAMBO) and 3.024 g (6.807 mmol) of 2,2-bis(3,4-dicarboxyphenyl) hexafluoropropane dianhydride is added to an initial feed of 25 mL of N-methylpyrrolidinone (NMP) and 10 mL toluene. After 68 hours, the resulting polyamic acid has an inherent viscosity of 3.27 dL/g (0.198 g/dL, 25.0° C.). The flask is chilled with an ice-water bath and a solution of 6.1 mL NMP, 1.55 mL acetic anhydride, and 0.4 mL β-picoline is added dropwise to the stirred, chilled PA over 5 minutes. The reaction mixture is allowed to warm to room temperature and is stirred 68 hours at room temperature.

The resulting solution is cast as a 0.5 mm film on a glass plate. The film is heated in an air-circulating oven at 100° C. for 1.0 hour, removed from the glass and secured in an aluminum frame. It is then placed in an air-circulating oven and heated at 225° C. for 20 minutes, heated for 20 minutes to 300° C., maintained at 300° C. for 1 hour, and then cooled to room temperature.

The resulting film exhibits a tensile strength of 20.3 Ksi (0.140 GPa), a tensile modulus of 575.6 Msi (3.97 GPa), and an elongation-at-break of 30.9 percent.

What is claimed is:

1. A polyamic acid having an inherent viscosity of greater than 2.0 dL/g, as measured at 0.2 g/dL in N-methylpyrrolidinone at 25° C., which comprises the reaction product, an capping agent, a reaction mixture comprised of a dianhydride of the formula:

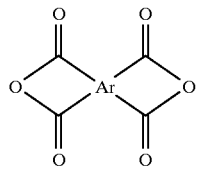

and a diaminobenzoxazole of the following formula:

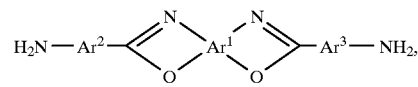

a)

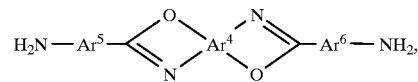

b)

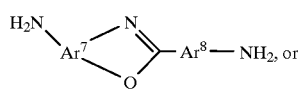

c)

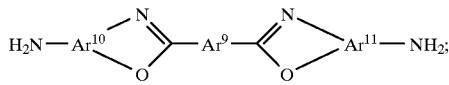

d)

where Ar, $Ar^1$, $Ar^2$, $Ar^3$, $Ar^4$, $Ar^5$, $Ar^6$, $Ar^7$, $Ar^8$, $Ar^9$, $Ar^{10}$ and $Ar^{11}$ can be any aromatic group or pyridine groups except that:

Ar does not equals

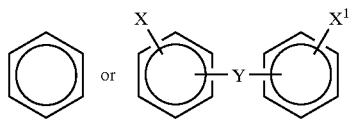

where Y is a single covalent bond, —O—, —CH$_2$—, —S—, —CO—, —SO$_2$—, —C(CH$_3$)$_2$— or —(CF$_3$)$_2$— and where X and $X^1$ are hydrogen atoms, alkyl groups, alkoxy groups or halogen atoms or groups, when $Ar^4$, $Ar^5$, and $Ar^6$ are all

and except that
Ar does not equal

when Arl is

and $Ar^2$ and $Ar^3$ are both

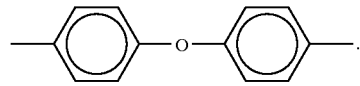

2. The polyamic acid of claim 1 in which the polyamic acid has an inherent viscosity of greater than 3 dL/g, as measured at 0.2 g/dL in N-methylpyrrolidinone at 25° C.

3. The polyamic acid of claim 1 in which the polyamic acid has an inherent viscosity of greater than 5 dL/g, as measured at 0.2 g/dL in N-methylpyrrolidinone at 25° C.

4. The polyamic acid of claim 1 in which the polyamic acid has an inherent viscosity of greater than 6 dL/g, as measured at 0.2 g/dL in N-methylpyrrolidinone at 25° C.

5. The polyamic acid of claim 1 in which the dianhydride is selected from the group 4,4'-oxydiphthalic anhydride, pyromellitic dianhydride, 2,2-bis-(3,4-dicarboxyphenyl) hexafluoropropane dianhydride, 3,3',4,4'-biphenyltetracarboxylic dianhydride, 3,3',4,4'-diphenylsulfonetetracarboxylic dianhydride and 3,3'4,4'-benzophenonetetracarboxylic dianhydride.

6. The polyamic acid of claim 1 in which the diaminobenzoxazole is selected from the group 2,6-(4,4'-diaminodiphenyl)benzo[1,2-d:5,4-d']bisoxazole, 5-amino-2-(p-aminophenyl)benzoxazole, 5-amino-2-(m-aminophenyl)benzoxazole, 4,4'-diphenylether-2,2'-bis(5-aminobenzoxazole), 2,2'-p-phenylenebis(5-aminobenzoxazole), and 2,2-bis(4-phenyl)hexafluoropropane-2,2'-bis(5-aminobenzoxazole).

7. A solution of the polyamic acid of claim 1 in an organic liquid, the polyamic acid solution having a bulk solution viscosity of, at most, about 500,000 centipoise.

8. A process for preparing the polyamic acid of claim 1 by dissolving the dianhydride and diaminobenzoxazole in an organic liquid reaction medium and maintaining the resulting mixture at a temperature from about −40° C. to about 150° C.

9. The process of claim 8 wherein the temperature is maintained from about 0° C. to about 50° C.

10. The process of claim 8 wherein the reaction medium further comprises a non-benzoxazole-containing diamine.

11. The process of claim 10 wherein the non-benzoxazole-containing diamine is 1,4-phenylenediamine or 4,4'-oxydianiline or 3,4'-oxydianiline.

12. The polyamic acid of claim 1 wherein the end capping agent is maleic anhydride, 2,3-dimethylmaleic anhydride, nadic anhydride, phthalic anhydride, aniline or 4-aminobenzocyclobutene.

13. A method for preparing a polyimidebenzoxazole from a solution of the polyamic acid of claim 1 and an organic liquid solvent, the method comprising removing at least a portion of the solvent and then exposing the polyamic acid to an imidization temperature from about 160° C. to about 240° C. to convert at least a portion of the polyamic acid to polyimidebenzoxazole.

14. A method for preparing polyimidebenzoxazole from a solution of the polyamic acid of claim 1 and an organic liquid solvent, the method comprising heating the polyamic acid solution to a volatilization temperature of from about 50° C. to about 130° C. to remove at least a portion of the solvent and subsequently to an imidization temperature from about 160° C. to about 280° C.

15. The method of claim 14 wherein the polyamic acid solution is heated at the volatilization temperature for a time from 5 minutes to 90 minutes and at the imidization temperature for a time from 5 minutes to 120 minutes.

16. The method of claim 15 further comprising heating the imidization product to a temperature from about 250° C. to about 600° C. and below the glass transition temperature of the polyimidebenzoxazole.

17. A method for preparing a polyimidebenzoxazole which comprises preparing a solution of a polyamic acid having an inherent viscosity of greater than 2.0 dL/g, as measured at 0.2 g/dL in N-methylpyrrolidinone at 25° C. in an organic liquid; the polyamic acid being the reaction product, in polymerized form, of a dianhydride of the formula:

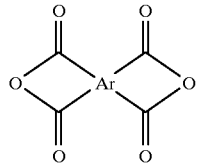

and a diaminobenzoxazole of any of the following formulae:

a)
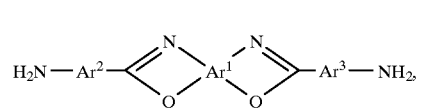

b)
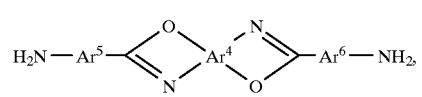

c)
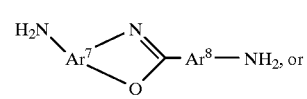

d)
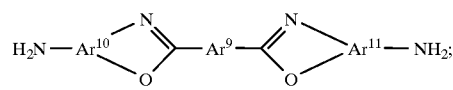

where Ar, $Ar^1$, $Ar^2$, $Ar^3$, $Ar^4$, $Ar^5$, $Ar^6$, $Ar^7$, $Ar^8$, $Ar^9$, $Ar^{10}$ and $Ar^{11}$ can be any aromatic group or pyridine group; removing at least a portion of the solvent; sequentially exposing the polyamic acid to an imidization temperature from about 185° C. to about 240° C to convert at least a portion of the polyamic acid to polyimidebenzoxazole; to an annealing temperature from about 250° C. to about 325° C. and then to a heat-treating temperature, higher than the annealing temperature, of from about 250° C. to about 600° C. for from about 0.1 to about 120 minutes; said annealing and heat-treating temperatures being below the glass transition temperature of the polyimidebenzoxazole.

18. The method of claim 17 wherein the organic liquid is partially removed by coagulating the polyamic acid.

19. The method of claim 17 wherein the polyimidebenzoxazole is a film.

20. The method of claim 19 in which imidization is conducted in the presence of a material or combination of materials which facilitate or accelerate ring closing.

21. The method of claim 20 in which the ring-closing agents are the combination of a dehydration agent and an organic base which facilitates their ring-closing activity.

* * * * *